US007636670B2

(12) United States Patent
Woehler

(10) Patent No.: US 7,636,670 B2
(45) Date of Patent: Dec. 22, 2009

(54) METHOD AND COMPUTER PROGRAM PRODUCT THAT DETERMINE VALUES OF CHARACTERISTIC VALUE COMBINATIONS FOR USE IN THE PRODUCTION OF PRODUCTS

(75) Inventor: Christian Farhad Woehler, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1523 days.

(21) Appl. No.: 10/274,414

(22) Filed: Oct. 17, 2002

(65) Prior Publication Data

US 2004/0078253 A1   Apr. 22, 2004

(51) Int. Cl.
*G06F 17/11* (2006.01)
*G06F 19/00* (2006.01)
(52) U.S. Cl. .............................. 705/7; 700/97; 700/99
(58) Field of Classification Search ............... 705/7
See application file for complete search history.

(56) References Cited

U.S. PATENT DOCUMENTS

| | | | | |
|---|---|---|---|---|
| 5,280,425 A * | 1/1994 | Hogge | ....................... | 712/300 |
| 5,327,340 A * | 7/1994 | Kaneko et al. | ............. | 700/101 |
| 5,548,518 A * | 8/1996 | Dietrich et al. | ............ | 700/100 |
| 6,198,980 B1 * | 3/2001 | Costanza | ..................... | 700/99 |
| 6,606,527 B2 * | 8/2003 | de Andrade et al. | ........... | 700/97 |
| 7,058,587 B1 * | 6/2006 | Horne | ........................... | 705/7 |
| 7,092,929 B1 * | 8/2006 | Dvorak et al. | ................ | 705/28 |
| 7,117,164 B2 * | 10/2006 | Slocum | ....................... | 705/10 |
| 7,171,903 B2 * | 2/2007 | Whittingham et al. | ...... | 101/484 |
| 7,249,044 B2 * | 7/2007 | Kumar et al. | .................. | 705/8 |
| 7,346,534 B1 * | 3/2008 | Martin et al. | .................. | 705/9 |

OTHER PUBLICATIONS

Hillier, "Introduction to Operations Research," 1995.*
Gomory. "On the Relation between Integer and Noninteger Solutions to Linear Programs," Proceedings of National Academy of Sciences of the United States of America, 1965.*
Glover. "Management Decisions and Integer Programming," The Accounting Review, 1969.*
IPro Foodservice Software, 1999.*
Ueberhuber, Numerical Computation, Springer-Verlag Berlin Heidelberg, 1997, p. 135-145.*
Walser, Integer Optimization by Local Search—A Domain-Independent Approach, 1999, p. 37-48.*
Klein and Young, Approximation algorithms for NP-hard optimization problems, Chapter 34, Algorithms and Theory of Computation Handbook, 1999, p. 1-23.*

(Continued)

*Primary Examiner*—Beth V Boswell
*Assistant Examiner*—Justin M Pats
(74) *Attorney, Agent, or Firm*—Blakely, Sokoloff, Taylor & Zafman LLP

(57) ABSTRACT

Methods and apparatus, including computer program products, implementing and using techniques for determining a quantity to be produced for each of two or more product types, where each product type is specified by one or more characteristics. An input specifying a desired distribution of the total quantity among the one or more characteristics is received. If the desired quantity to be produced of a product type is a non-integer value, the desired quantity is rounded to an integer to generate a final quantity to be produced for each product type. The final quantity preserves both a total quantity and the desired distribution of the total quantity among the one or more characteristics.

10 Claims, 2 Drawing Sheets

OTHER PUBLICATIONS

Miller and Franz, A Binary-Rounding Heuristic for Multi-Period Variable-Task-Duration Assignment Problems, Computers Ops. Res., vol. 23, No. 8, 1996, p. 819-28.*

Kennington and Whitler, An Efficient Decomposition Algorithm to Optimize Spare Capacity in a Telecommunications Network, INFORMS Journal on Computing, vol. 11, No. 2, Spring 1999, p. 149-160.*

*Example of Disaggregation and Rounding*, May 2002, SAP Help Portal, http://help.sap.com/saphelp_apo31ca/helpdata/en/92/dd013872af2946e10000009b38f8cf/frameset.htm.

* cited by examiner

METHOD AND COMPUTER PROGRAM PRODUCT THAT DETERMINE VALUES OF CHARACTERISTIC VALUE COMBINATIONS FOR USE IN THE PRODUCTION OF PRODUCTS

BACKGROUND

This invention relates to determining characteristic combinations in a production environment. Many products exist in different configurations, such as different colors, different sizes, different models, or combinations thereof. A product manufacturer is typically interested in producing a certain number of products of each configuration. A simplified example of a typical situation is as follows.

Assume that a car manufacturer produces cars of three colors; red, green and blue. During a given week, the manufacturer would like to produce a total of 10 cars that are as evenly distributed among the three colors as possible. If the total number of products to be produced in a given day is of the same or lesser order of magnitude as the number of combinations, or if the resulting characteristic combinations have to be represented as integers, problems can occur. For example, if the 10 cars are to be produced in five working days, the number of cars produced per day is two, and the manufacturer would have to produce ⅔ or 0.67 cars of each color per day, which is not possible.

In existing systems, this problem is typically solved by rounding the values up or down to the nearest integer. Thus, the production on day 1 is determined as follows. The desired 0.67 red cars is rounded up to 1.0 car. The difference between the produced number and the desired number, −0.33, is added to the 0.67 green cars to be produced, giving a total of 0.34 green cars. This number is rounded down to 0 green cars. The difference 0.34 is added to the 0.67 blue cars to be produced, giving a total of 1.01 blue cars. This number is rounded down to 1.0 blue cars. This yields a red car and a blue car on day 1. If the same method is repeated each working day, and at the end of the week, a total of 10 cars have been produced, five of which are red and five of which are blue. No green cars will be produced during the entire week. Even though 10 cars have been produced, the distribution among the three colors does not satisfy the original intentions to have the cars distributed as evenly as possible among the three different colors.

An alternative rounding algorithm rounds the value 0.67 for each color up to 1. However, the individual rounding results in a change of the total sum to 15 instead of 10, thereby exceeding the desired subtotals for each combination of characteristics. As can be seen, both the above-described rounding procedures are inconsistent, and the results are therefore often corrected manually after the initial result has been produced, which can be a very time consuming task, or may not even be possible when there are a large number of characteristics.

It should be noted that the problem described above is particularly prevalent for cases where the desired number of items is of the same order of magnitude as the total number of combinations. The two rounding procedures described above work better if the total value to be disaggregated is much larger than the number of combinations.

SUMMARY

In general, in one aspect, this invention provides methods and apparatus, including computer program products, implementing and using techniques for determining a quantity to be produced for each of two or more product types, where each product type is specified by one or more characteristics. An input specifying a desired distribution of the total quantity among the one or more characteristics is received. If the desired quantity to be produced of a product type is a non-integer value, the desired quantity is rounded to an integer to generate a final quantity to be produced for each product type. The final quantity preserves both a total quantity and the desired distribution of the total quantity among the one or more characteristics.

Advantageous implementations can include one or more of the following features. An input specifying a total quantity of products to be produced can be received. A desired quantity to be produced can be determined for each product type, including using the total quantity and the distribution of the total quantity among the one or more characteristics. Rounding can include rounding the desired quantity to an integer to generate a final quantity using previously rounded quantities for other product types having one or more of the same characteristics.

P characteristics can span a p-dimensional space and product type is defined as a point in the p-dimensional space, the point being determined by a combination of values for each of the p characteristics. Including previously rounded quantities can include calculating a difference function for each dimension, the difference function using previously rounded quantities and using the calculated difference functions when rounding the desired quantity to an integer to generate a final quantity.

Rounding can include using an integer function f[x, y]=int [x+y], where x is the desired quantity and y is the sum of the calculated difference functions, and where the integer function keeps the integer part of the sum of x and y and discarding the fractional part of the sum x+y. Rounding can include using a rounding function f[x, y]=r[x+y]int[(x+y)+0.5], where x is the desired quantity and y is the sum of the calculated difference functions, the rounding function rounding the sum of x and y up or down to a nearest integer value. Rounding can include using a bounded rounding function f[x, y]=b_r[x, y]=r[x+max[−0.5, 0.5−ϵ; y]], where x is the desired quantity and y is the sum of the calculated difference functions and ϵ is a small non-zero value depending on the precision of the number x, the maximum function max[x1, x2; y] having the value −0.5 when y is smaller than −0.5, the value y when y is between −0.5 and +0.5, and the value +0.5 when y is larger than +0.5.

In general, in one aspect, this invention provides methods and apparatus, including computer program products, implementing and using techniques for determining a quantity to be produced for each of two product versions. Each product version is specified by two characteristics. An input specifying a desired total quantity to be produced, a number of discrete time periods over which the total quantity is to be produced, and a desired distribution of the total quantity among the two product versions is received. The desired total quantity is divided into a desired quantity for each discrete time period, while maintaining the desired distribution among the two product versions. For each discrete time period, if the desired quantity to be produced of a product type during the discrete time period is a non-integer value, the desired quantity is rounded to an integer to generate a final quantity to be produced for each product type during the discrete time period. The rounding accounts for final quantities that have been determined for previous discrete time periods. The final quantity preserves both the total quantity and the desired distribution of the total quantity among the two characteristics at the end of the discrete time periods.

The invention can be implemented to realize one or more of the following advantages. An improvement in accuracy over existing distribution algorithms is accomplished, where the historical distribution of each characteristic is taken into account. The total number of products to be manufactured, as well as the numbers of products for each characteristic value is preserved. When a characteristic combination is calculated, the calculation looks at how each of the characteristics involved in the combination has been distributed among the previously calculated characteristics. The algorithm is efficient, and is capable of handling a very large number of characteristic combinations. The improved rounding method can be used to give better results in a number of applications, such as demand planning applications for supply chains, including characteristics-based forecasting (CBF) applications, which are used to forecast configurable products. In a CBF environment, the total number of produced items is typically of the order of magnitude of the number of combinations and it is very important that the rounding is consistent. The individual characteristic values are typically given and the values for the characteristic value combinations are calculated by multiplying the individual proportions for characteristic values, for example, 33% red cars and 20% total production on a given day gives that 6.6% of the total number of cars should be manufactured in the color red on that day. The multiplication often leads to a distribution that makes the results of an inconsistent rounding procedure striking, and can be avoided with the inventive rounding algorithm. Furthermore, there is no need for manually modifying any of the combinations.

Values can be rounded with respect to time disaggregation in connection with characteristic values combinations, since a time series can be processed as a generalized characteristic, just like color, model, size, and so on. Time disaggregations are common in various types of existing production planning software, and are typically considered independently of characteristic values combinations, which lead to the problems mentioned above.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
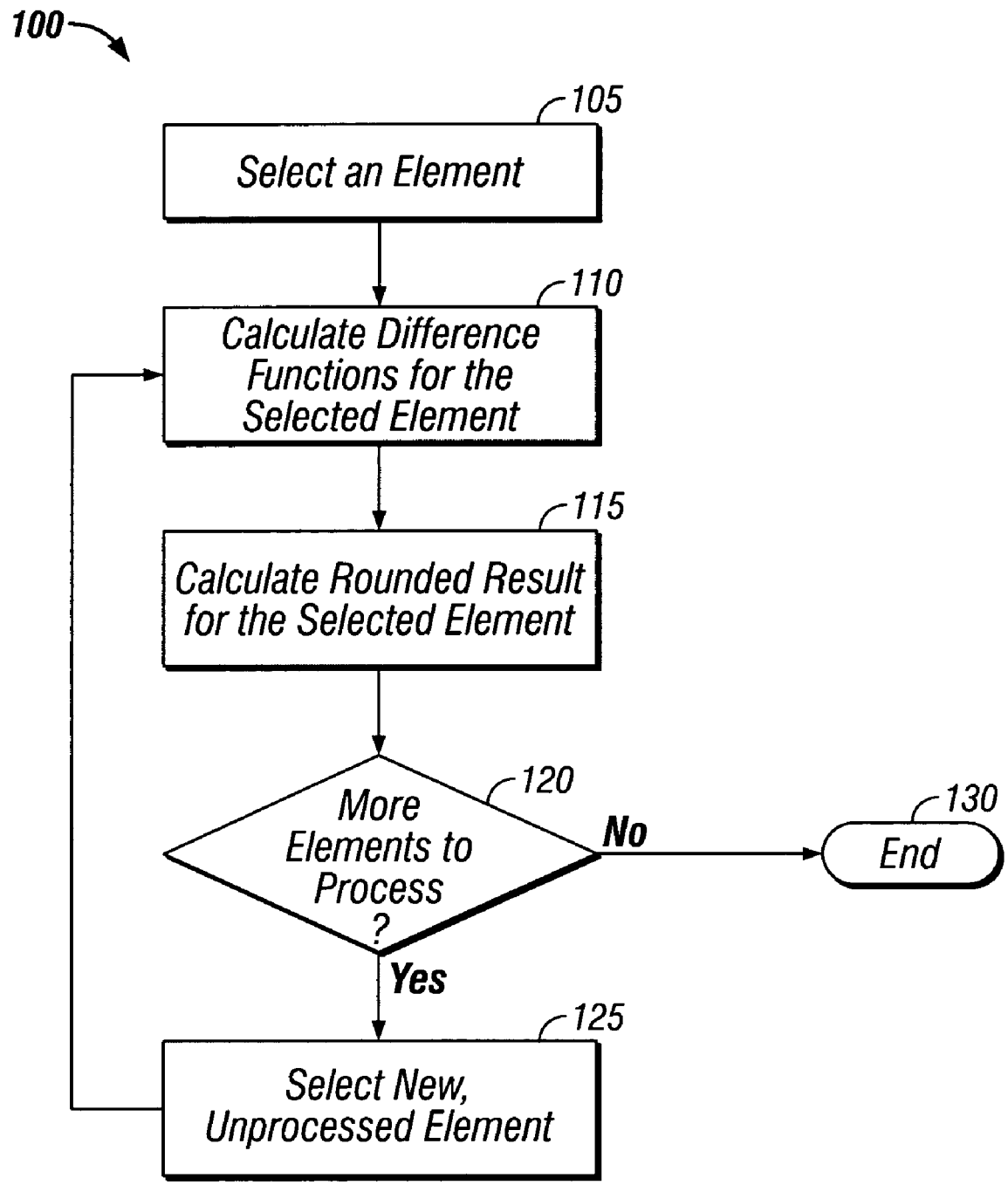
FIG. 1 is a flowchart showing a rounding process in accordance with the invention.

The method for determining values for characteristic combinations is based on two fundamental parts; an accounting algorithm and a rounding algorithm. The accounting algorithm takes into account the contributions to the total sum from the previously determined combinations and ensures that the total number of produced items is correct, as well as the partial sums for each of the different characteristics (each color and each day in the above example). The rounding algorithm is used for calculating the result for each new element. It is assumed that the number of characteristics is p, and the characteristics are represented in a p-dimensional cube.

The Accounting Algorithm

An exemplary implementation of an accounting algorithm will now be described. First, the accounting algorithm will be described from a mathematical point of view, and then an exemplary computer program implementation will be described.

Each characteristic n (n=1 . . . p) can have $N_n$ possible values. If the color of the car in the introductory example is designated as characteristic 1 and the day is designated as characteristic 2, then $N_1=3$ and $N_2=5$. Each combination of characteristics is obtained by enumerating the characteristics and the values of the characteristics and representing the combinations by p integer values $(i_1, \ldots, i_p)$. If some combinations are not possible, the combination can still be included but be assigned the value zero.

If the original values to be rounded are represented by $a(i_1, \ldots, i_p)$ and the resulting values are represented by $b(i_1, \ldots, i_p)$, smaller elements to $a(i_1, \ldots, i_p)$ are defined as elements $a(j_1, \ldots, j_p)$ for which $j_n \leq i_n$ for $n=1, \ldots, p$, and for which $j_n \leq i_n$ for at least one n, since the elements otherwise would be identical. Smaller elements represent characteristic combinations that need to be taken into account when the value of a subsequent characteristic combination is determined. In the two-dimensional case the smaller elements of a given element are the elements that belong to the lower numbered columns and rows than the element to be calculated. In the accounting algorithm all the rounding differences for the smaller elements are taken into account in the following way.

For each dimension, a difference function $d_n$ is calculated as:

$$d_n(i_1, \ldots, i_p) = \Sigma_{m=n, \ldots, p} d_m(i_1, \ldots, i_{n-1}, i_n-1, i_{n+1}, \ldots, i_p) + (a(i_1, \ldots, i_n-1, i_{n-1}, i_{n+1}, \ldots, i_p) - b(i_1, \ldots, i_{n-1}, i_n-1, i_{n+1}, \ldots, i_p)),$$

for all n=1, . . . , p.

The lower boundary values of the differences and the original elements are given by:

$$d_n(i_1, \ldots, i_p) = 0 \text{ if } i_m=0, \text{ for all } m=1, \ldots, p \text{ and for all } n=1, \ldots, p.$$

$$a(i_1, \ldots, i_p) = 0 \text{ if } i_m=0, \text{ for all } m=1, \ldots, p$$

$$b(i_1, \ldots, i_p) = 0 \text{ if } i_m=0, \text{ for all } m=1, \ldots, p.$$

The Rounding Function

The result $b(i_1, \ldots, i_p)$ for the individual elements are given by a rounding function $f[x,y]$, which depends on the element itself and all the differences for the combination as follows: $b(i_1, \ldots, i_p) = f[a(i_1, \ldots, i_p), \Sigma_{n=1, \ldots, p} d_n(i_1, \ldots, i_{n-1}, i_n-1, i_{n+1}, \ldots, i_p)]$.

There are many different types of rounding functions that can be used in the above calculations. One possibility is to use an integer function $f[x, y] = \text{int}[x+y]$, which keeps the integer part of a number and discards the fractional part of the number. A second possibility is to use a standard rounding function $f[x, y] = r[x+y] = \text{int}[(x+y)+0.5]$. The standard rounding function rounds a number up or down to the nearest integer value.

The rounding functions have properties that are useful for providing certain features of the rounding algorithm, and preserving the total sum and of the subtotal sums. For this reason the rounding algorithm using the two rounding functions is referred to as a strictly consistent rounding algorithm. However, the two rounding functions listed above may not be useful for typical consistent rounding situations, since the above rounding functions may lead to large rounding differences, thereby producing negative results or too large deviations from the original value, which is typically not acceptable in various types of planning and manufacturing applications.

An alternative to the two rounding functions described above is a bounded rounding function $f[x, y]=b\_r[x, y]=r[x+ \max[-0.5, 0.5-\epsilon; \Sigma_{n=1,\ldots,p}d_n(i_1,\ldots,i_p)]]$, with $\epsilon>0$ but very small. The actual value of $\epsilon$ depends on the precision used for the values in the implementation of the algorithm. The maximum function $\max[x1, x2; x]$ used above is defined by $$\max[x_1, x_2, x] = \begin{cases} x_1 & \text{if } x < x_1 \\ x & \text{if } x_1 \le x_2 \\ x_2 & \text{if } x_2 < x \end{cases}$$

The bounded rounding function represents an improved solution for typical disaggregation situations with a consistent rounding problem. The previous rounding differences are taken into account as much as possible without rounding the actual element excessively. Examples of what would be an excessive rounding are when a zero value is rounded to a negative value, when an original value smaller than or equal to 1.0 is rounded to the integer value of 2.0, or when an integer value is rounded to a different integer value, and so on.

The boundaries of −0.5 and +0.5 coincide with the maximum rounding differences that can occur in a one-dimensional case. When the bounded rounding function is used for the calculation of the very last element, a special check must be performed in order to preserve the total sum. The special check will be described in further detail below. The rounding algorithm using the bounded rounding function is referred to as a consistent rounding algorithm, as opposed to the previously mentioned strictly consistent rounding algorithms, due to differences when the boundaries are reached.

As can be seen in FIG. 1, a process (100) in which the rounding algorithm is applied starts by selecting an element (step 105) and calculating first all the p difference functions $d_p$ for the selected element (step 110). The rounded result for the selected element is then calculated using the appropriate rounding function (step 115). When the result has been obtained, the process (100) continues to check whether there are any other elements that need to be rounded (step 120). If there are other elements, the process selects a new element (step 125) and returns to step 110 and calculates the difference functions for the newly selected element. When there are no more elements to be rounded in step 120, the process ends (step 130). It should be noted that the sequence in which the elements are calculated is not unique, but that when rounding a given element, all the difference functions for the smaller elements have to be calculated beforehand, as should be clear from the mathematical discussion above. For example, in one implementation, it is possible to start with the element $(1, \ldots, 1)$ and then increase the number of the last index one by one to $N_p$, that is, calculating the difference functions for all the elements along one dimension while keeping the other dimensions constant. This corresponds to calculating the difference functions of all the elements in a column or in a row of a two-dimensional space. Then, the second to last number can be increased to 2 and the element $(1, \ldots, 2, 1)$ is calculated. Again, the last index is increased one by one until $N_p$ is reached, and so on. This procedure can be applied to the other indices to calculate the results for all the elements.

Effects of Bounded Rounding Function on the Last Element

For the bounded rounding function, the total sum is not preserved if the upper or the lower boundaries are reached in the calculation of the very last element. For this reason, special checks and calculations have to be executed for the calculation of the last element. If the boundaries are reached for the last element, the restriction of the upper boundary can be ignored, that is, if the upper boundary is reached, the calculation is finished. However, the lower boundary cannot be ignored since negative values may result, which are not acceptable in a production setting. If the lower boundary is reached, or the result after rounding without lower boundary would be negative, the rounding of one or more previous elements must be changed in such a way that the differences carried over from the elements result in a change of the sign for the element under consideration. The change of sign can be done by taking a sufficient number of the largest negative differences, such that if the values of the negative differences are increased by +1.0, a total carry over results that no longer violates the lower boundary. When the group of difference functions that need to be changed have been identified, each difference function in the group can be changed by the value +1.0 by changing the result for the respective relevant neighboring elements by −1.0, which is clearly not possible if one of the neighboring elements is zero. In such a situation, the procedure must be repeated for the neighboring element is 5 in order to find, through the negative difference function for the neighboring element, the next neighboring element for which the result can be changed so that the difference function contributing to the last element is increased by +1.0. The procedure is performed for all the chosen negative difference functions.

In summary, if the result for the last element is negative, all the appropriate results for the nearest elements are reduced by −1.0 so that the rounding of the last element can be performed in such a way that the last element is assigned a value of zero, which preserves the total sum.

A Special Case: Strongly Restricted Characteristic Combinations

If the number of given characteristics combinations is much smaller than the number of possible combinations, many combinations with the value zero have to be added, which can lead to unacceptable calculation times and memory requirements.

Many different types of checks can be done to classify the distribution of the original non-zero combinations. The distribution can also be changed by reordering the enumeration of the characteristic combinations in such a way that the algorithm will produce different results. For example, the non-zero combinations can be distributed so that the number of elements that are smaller than the other elements is as low as possible. As a result, the required number of calculations is minimized, but the intended results may not be obtained, since more elements are treated as independent, that is, the previous rounding differences are not taken into account.

Since the types of checks and redistribution in most cases are very time consuming and dependent on individual preferences, only a simple procedure will be described here: The first check is to determine whether the total number of combinations is very large. If so, it is determined whether the number of added combinations is more than a certain percentage of the total combinations, for example, 90%. If the number of non-zero combinations is close, for example, within 200%, of the number of characteristic values of the characteristic with the most values, the problem can be treated as a one-dimensional problem. The one-dimensional rounding algorithm can then be used to round only the non-zero combinations sequentially.

However, if the problem cannot be treated as an one-dimensional problem one can consider the characteristic with the most values separately. The rounding for the values of the characteristic is performed separately with the one-dimensional rounding algorithm. The rounding result for each value of the characteristic is the sum for an aggregate of combinations with respect to the other characteristics. Thus, a p-dimensional problem can be reduced to N (p−1)-dimensional problems, with N being the number of values of the characteristic with the most values. If the (p−1)-dimensional problems still have too many added combinations the same procedure can be repeated for the characteristic with the second most values to reduce further the dimensionality of the remaining cubes. The procedure can be continued until the remaining combinations can be treated with the consistent rounding algorithm.

A Three-dimensional Example

Figure 2A:
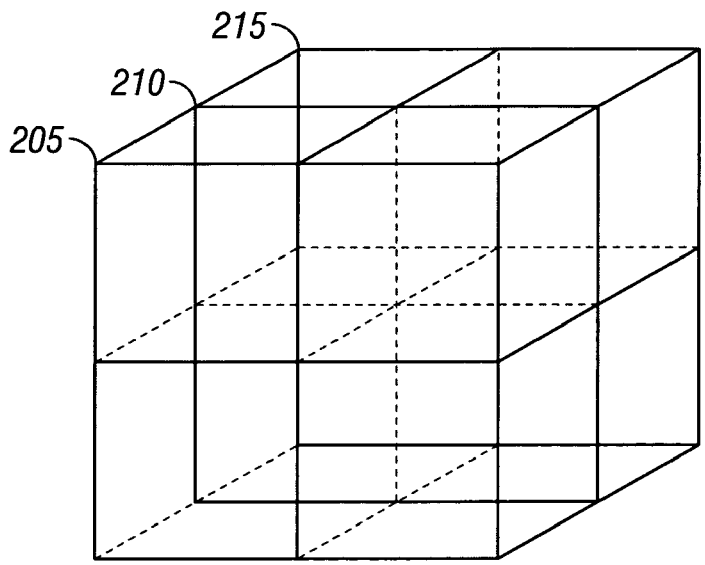
FIGS. 2A-2D show a three-dimensional space in which the rounding process can be applied.
Figure 2A:
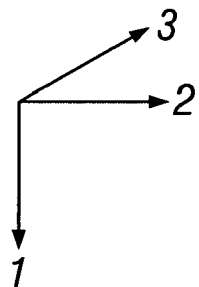
Figure 2B:
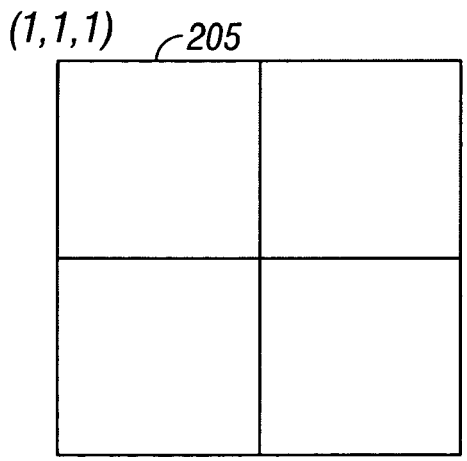
Figure 2C:
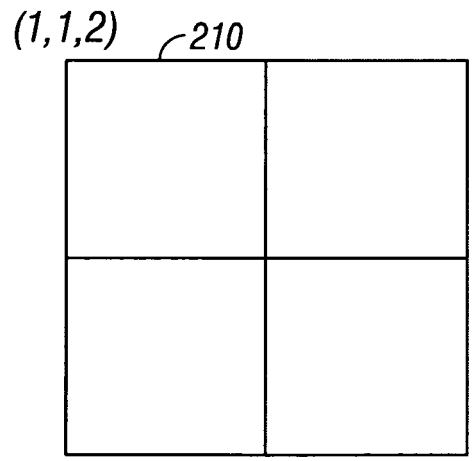
Figure 2D:
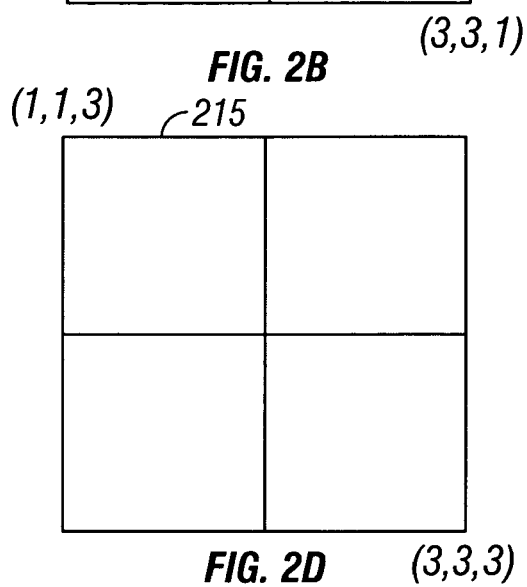

In order to facilitate the understanding of the algorithms above, an example will be given for a three-dimensional case, that is, a combination of three characteristics. FIG. 2A shows a three-dimensional cube, in which there are three characteristics having three values each. For this example, it is assumed that the desired distribution between the different combinations is the ratio of 0.66, that is, each lattice point (i.e. intersection between two lines) in the cube has the value 0.66. FIGS. 2B-2C show a split up version of the three dimensional cube into three separate planes, in order to illustrate how the coordinates of the lattice points are identified. FIG. 2B shows the front vertical plane of the cube, FIG. 2C shows the central vertical plane of the cube, and FIG. 2D shows the back vertical plane of the cube. The numbers will now be rounded up or down to the closest integer in accordance with the rounding algorithm.

The general formulas listed above for the rounding algorithm and the accounting algorithm can be written as follows for the three dimensional case:

$$d_3(i, j, k) = d_3(i, j, k-1) + (a(i, j, k-1) - b(i, j, k-1))$$

$$d_2(i, j, k) = d_2(i, j-1, k) + d_3(i, j-1, k) + (a(i, j-1, k) - b(i, j-1, k))$$

$$d_1(i, j, k) = d_1(i-1, j, k) + d_2(i-1, j, k) + d_3(i-1, j, k) + (a(i-1, j, k) - b(i-1, j, k))$$

$$b(i, j, k) = b\_r[a(i, j, k) + d_1(i, j, k) + d_2((i, j, k) + d_3(i, j, k)]$$

For convenience, the calculations below are presented with only two decimal places, which leads to obvious rounding errors. However, in a practical application, the rounding errors can be minimized by using a higher number of decimal places.

When point (1, 1, 1) is inserted into the equations, the following results are obtained.

$d_3(1, 1, 1) = 0$ $d_2(1, 1, 1) = 0$ $d_1(1, 1, 1) = 0$ $b(1, 1, 1) = r[0.66] = 1$

For point (2, 1, 1), the following results are obtained:

$d_3(2, 1, 1) = 0$ $d_2(2, 1, 1) = 0$ $d_1(2, 1, 1) = 0.66 - 1 = -0.34$ $b(2, 1, 1) = r[0.66 + (-0.34)] = 0$

For point (1, 2, 1), the following results are obtained:

$d_3(1, 2, 1) = 0$ $d_2(1, 2, 1) = 0.66 - 1 = -0.34$ $d(1, 2, 1) = 0$ $b(1, 2, 1) = r[0.66 + (-0.34)] = 0$

For point (2, 2, 1), the following results are obtained:

$d_3(2, 2, 1) = 0$ $d_2(2, 2, 1) = 0.66 - 0 = 0.66$ $d_1(2, 2, 1) = -0.34 + 0.66 = 0.32$ $b(2, 2, 1) = r[0.66 + \max[-0.5, 0.5 - 0.01; (0.66 + 0.32)]r [0.66 + 0.49] = 1$ For point (1, 1, 2), the following results are obtained:

$d_3(1, 1, 2) = 0.66 - 1 = -0.34$ $d_2(1, 1, 2) = 0$ $d_1(1, 1, 2) = 0$ $b(1, 1, 2) = r[0.66 + (-0.34)] = 0$

For point (2, 1, 2), the following results are obtained:

$d_3(2, 1, 2) = 0 + 0.66 - 0 = 0.66$ $d_2(2, 1, 2) = 0$ $d_1(2, 1, 2) = 0 + 0 + (-0.34) + 0.66 - 0 = 0.32$ $b(2, 1, 2) = r[0.66 + \max[0.5, 0.5 - 0.01; (0.66 + 0.32)] = r [0.66 + 0.49] = 1$ For point (1, 2, 2), the following results are obtained:

$d_3(1, 2, 2) = 0 + 0.66 - 0 = 0.66$ $d_2(1, 2, 2) = 0 + (-0.34) + 0.66 - 0 = 0.32$ $d_1(1, 2, 2) = 0$ $b(1, 2, 2) = r[0.66 + \max[-0.5, 0.5 - 0.01; (0.66 + 0.32)] = r [\mathbf{0.66 + 0.49}] = \mathbf{1}$ For point (2, 2, 2), the following results are obtained:

$d_3(2, 2, 2) = 0 + 0.66 - 1 = -0.34$ $d_2(2, 2, 2) = 0 + 0.66 + 0.66 - 1 = 0.32$ $d_1(2, 2, 2) = 0 + 0 + (-0.34) + 0.66 - 0 = 0.32$ $b(2, 2, 2) = r[0.66 + \max[-0.5, 0.5 - 0.01; 0.30] = r[0.66 + 0.49] = 1$ For point (3, 1, 1), the following results are obtained:

$d_3(3, 1, 1) = 0$ $d_2(3, 1, 1) = 0$ $d_1(3, 1, 1) = (-0.34) + 0.66 - 0 = 0.32$ $b(3, 1, 1) = r[0.66 + 0.32] = 1$

For point (3, 2, 1), the following results are obtained:

$d_3(3, 2, 1) = 0$ $d_2(3, 2, 1) = 0 + 0 + 0.66 - 1 = -0.34$ $d_1(3, 2, 1)=0.32+0.66+0.66-1=0.64$ $b(3, 2, 1)=r[0.66+0.30)]=1$

For point (1, 3, 1), the following results are obtained:

$d_3(1, 3, 1)=0$ $d_2(1, 3, 1)=(-0.34)+0+0.66-0=0.32$ $d_1(1, 3, 1)=0$ $b(1, 3, 1)=r[0.66+0.32]=1$

For point (2, 3, 1), the following results are obtained:

$d_3(2, 3, 1)=0$ $d_2(2, 3, 1)=0.66+0+0.66-1=0.32$ $d_1(2, 3, 1)=0+0.32+0+0.66-1=0$ $b(2, 3, 1)=r[0.66+0.32]=1$

For point (3, 3, 1), the following results are obtained:

$d_3(3, 3, 1)=0$ $d_2(3, 3, 1)=(-0.34)+0+0.66-1=-0.68$ $d_1(3, 3, 1)=0+0.32+0+0.66-1=0$ $b(3, 3, 1)=r[0.66+\max[-0.5, 0.5-0.01; (1-0.68]]=r[0.66+(-0.5)]=0$ For point (3, 1, 2), the following results are obtained:

$d_3(3, 1, 2)=0+0.66-1=-0.34$ $d_2(3, 1, 2)=0$ $d_1(3, 1, 2)=0.32+0.66+0.66-1=0.64$ $b(3, 1, 2)=r[0.66+\max[-0.5, 0.5-0.01; (0.64+(-0.34))]]=r[0.66+0.49]=1$ For point (1, 1, 3), the following results are obtained:

$d_3(1, 1, 3)=(-0.34)+0.66-0=0.32$ $d_2(1, 1, 3)=0$ $d_1(1, 1, 3)=0$ $b(1, 1, 3)=r[0.66+0.32)]=$1

For point (2, 1, 3), the following results are obtained:

$d_3(2, 1, 3)=0.66+0.66-1=0.32$ $d_2(2, 1, 3)=0$ $d_1(2, 1, 3)=0.32+0.66-1=0$ $b(2, 1, 3)=r[0.66+0.32)]=$1

For point (3, 1, 3), the following results are obtained:

$d_3(3, 1, 3)=(-0.34)+0.66-11=-0.68$ $d_2(3, 1, 3)=0$ $d_1(3, 1, 3)=0.32+0.66-1=0$ $b(3, 1, 3)=r[0.66+\max[-0.5, 0.5-0.01; (-0.68)]]=r[0.66+(-0.5)]=0$ For point (3, 2, 2), the following results are obtained:

$d_3(3, 2, 2)=0.66-1=-0.34$ $d_2(3, 2, 2)=(-0.34)+0.66-1=-0.68$ $d_1(3, 2, 2)=(-0.34)+0.32+0.32+0.66-1=0.04$ $b(3, 2, 2)=r[0.66+\max[-0.5, 0.5-0.01; (-0.98)]=r[0.66+(-0.5)]=0$ For point (1, 2, 3), the following results are obtained:

$d_3(1, 2, 3)=0.66+0.66-1=0.32$ $d_2(1, 2, 3)=0+0.32+0.66-1=-0.02$ $d_1(1, 2, 3)=0$ $b(1, 2, 3)=r[0.66+0.30)]=1$

For point (2, 2, 3), the following results are obtained:

$d_3(2, 2, 3)=(-0.34)+0.66-1=-0.68$ $d_2(2, 2, 3)=0+0.32+0.66-1=-0.02$ $d_1(2, 2, 3)=0.30+0.66-1=-0.04$ $b(2, 2, 3)=r[0.66+\max[-0.5, 0.5-0.01; (-0.62)]]=r[0.66+(-0.5)]=0$ For point (3, 2, 3), the following results are obtained:

$d_3(3, 2, 3)=(-0.34)+0.66-0=0.32$ $d_2(3, 2, 3)=(-0.68)+0.66-0=-0.02$ $d_1(3, 2, 3)=-0.04-0.02+0.32+0.66-0=0.82$ $b(3, 2, 3)=r[0.66+\max[-0.5, 0.5-0.01; 0.82]=r[0.66+0.9]=1$ For point (1, 3, 2), the following results are obtained:

$d_3(1, 3, 2)=0.66-1=-0.34$ $d_2(1, 3, 2)=0.32+0.66+0.66-1=0.64$ $d_1(1, 3, 2)=0$ $b(1, 3, 2)=r[0.66+0.30]=1$

For point (2, 3, 2), the following results are obtained:

$d_3(2, 3, 2)=0.66-1=-0.34$ $d_2(2, 3, 2)=\mathbf{-0.02+0.66-1=-0.32}$ $d_1(2, 3, 2)=0.30+0.66-1=-0.04$ $b(2, 3, 2)=r[0.66+\max[-0.5, 0.5-0.01; (-0.67)]=r[0.66+(-0.5)]=0$ For point (3, 3, 2), the following results are obtained:

$d_3(3, 3, 2)=0.66-0=0.66$ $d_2(3, 3, 2)=-11.02+0.66-0=-0.36$ $d_1(3, 3, 2)=0.70+0.66-0=0.04$ $b(3, 3, 2)=r[0.66+0.26]=1$

For point (1, 3, 3), the following results are obtained:

$d_3(1, 3, 3)=(-0.34)+0.66-1=-0.68$ $d_2(1, 3, 3)=0.30+0.66-1=-0.68$ $d_1(1, 3, 3)=0$ $b(1, 3, 3)=r[0.66+\max[-0.5, 0.5-0.01; (-0.7)]=r[0.66+(-0.5)]=0$ For point (2, 3, 3), the following results are obtained:

$d_3(2, 3, 3)=(-0.34)+0.66-0=0.32$ $d_2(2, 3, 3)=-0.70+0.66-0=-0.04$ $d_1(2, 3, 3)=-0.72+0.66-0=-0.06$ $b(2, 3, 3)=r[0.66+0.22]=1$

For point (3, 3, 3), the following results are obtained:

$d_3(3, 3, 3)=0.66+0.66-1=0.32$ $d_2(3, 3, 3)=0.30+0.66-1=-0.04$ $d_1(3, 3, 3)=0.22+0.66-1=-0.12$ $b(3, 3, 3)=r[0.66+0.16]=1$

As can be seen from this example, 18 of the 27 nodes in the three dimensional cube has been rounded to up the value 1, and 9 of the 27 nodes have been rounded down to the value 0. Thus, the overall ratio of 0.66, or total sum, has been preserved. Furthermore, for all the characteristic combinations with two values specified (each straight line in the cube crossing three nodes), the subtotal is two. For all the characteristic combinations with one value specified (each plane in the cube containing nine nodes), the subtotal is six. Consequently, the distribution between the various characteristics is as even as possible.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. The invention does not have to be applied in a production environment. For example, the invention can be used when rounding errors occur in various software applications due to copying of data from variables having decimal precision to variables having integer precision. Another area in which the inventive methods and applications can be applied is in demand planning software applications, when numbers are disaggregated into characteristic value combinations.

The distribution of values between the different combinations does not have to be uniform. The total sum, or the subtotal sums for given characteristic value combinations (for example, lines, planes, and so on, in the three dimensional example presented above) do not have to add up to integer values. The rounding of the sum of the original values will produce the same value as the sum of the rounded values.

What is claimed is:

1. A method comprising:
   receiving a total quantity value;
   receiving a plurality of distribution rules for distributing the total quantity value to a plurality of product types, each distribution rule to govern a separate characteristic of the plurality of product types;
   applying the plurality of distribution rules to the total quantity value to derive a desired quantity value for each of the plurality of product types;
   rounding in a computer processor the desired quantity value for each of the plurality of product types to an integer when the desired quantity value is a non-integer, the rounding includes:
      maintaining the sum of the desired quantity values as equal to the total quantity value;
      approximating the plurality of distribution rules for each value of each separate characteristic as applied to the desired quantity values, taking into account, for the desired quantity value of a product type of the plurality of product types being rounded, rounding errors of desired quantity values rounded prior to the desired quantity value of the product type being rounded, wherein p characteristics of the plurality of product types span a p-dimensional space and each of the plurality of product types is defined as a point in the p-dimensional space, the point being determined by a combination of values for each of the p characteristics;
      calculating a difference function for each dimension, the difference function using previously rounded quantities;
      using the calculated difference functions when rounding the desired quantity value to an integer; and
      using a bounded rounding function $f[x, y]=b\_r[x, y]=r[x+\max[-0.5, 0.5-\epsilon; y]]$, wherein x is the desired quantity value and y is the sum of the calculated difference functions and $\epsilon$ is a small non-zero value depending on the precision of the number x, the maximum function $\max[x1, x2; y]$ having the value of $-0.5$ when y is smaller than −0.5, the value y when y is between −0.5 and +0.5, and the value +0.5 when y is larger than +0.5; and applying the rounded desired quantity values to a production of products.

2. The method of claim 1, the total quantity value specifying a total quantity of products to be produced.

3. The method of claim 1, wherein rounding comprises:
using a previously rounded quantity of a first product type for a desired quantity value of a second product type.

4. The method of claim 1, wherein the plurality of distribution rules are defined by a ratio, a percentage, or a specific value associated with the separate characteristic of the product type.

5. The method of claim 1, wherein the separate characteristic is any one of a time, a color, a model, or a size.

6. A computer program product, tangibly stored on a machine-readable medium, comprising instructions operable to cause a programmable processor to:

receive a total quantity value;

receive a plurality of distribution rules for distributing the total quantity value to a plurality of product types, each distribution rule to govern a separate characteristic of the plurality of product types;

apply the plurality of distribution rules to the total quantity value to derive a desired quantity value for each of the plurality of product types; and round the desired quantity value for each of the plurality of product types to an integer when the desired quantity value is a non-integer, the rounding includes:

maintaining the sum of the desired quantity values as equal to the total quantity value;

approximating the plurality of distribution rules for each value of each separate characteristic as applied to the desired quantity values, taking into account, for the desired quantity value of a product type of the plurality of product types being rounded, rounding errors of desired quantity values rounded prior to the desired quantity value of the product type being rounded, wherein p characteristics of the plurality of product types span a p-dimensional space and each of the plurality of product types is defined as a point in the p-dimensional space, the point being determined by a combination of values for each of the p characteristics;

calculating a difference function for each dimension, the difference function using previously rounded quantities;

using the calculated difference functions when rounding the desired quantity value to an integer; and using a bounded rounding function $f[x, y] = b\_r[x, y] = r[x + \max[-0.5, 0.5-\epsilon; y]]$, wherein x is the desired quantity value and y is the sum of the calculated difference functions and $\epsilon$ is a small non-zero value depending on the precision of the number x, the maximum function $\max[x1, x2; y]$ having the value of −0.5 when y is smaller than −0.5, the value y when y is between −0.5 and +0.5, and the value +0.5 when y is larger than +0.5; and apply the rounded desired quantity values to a production of products.

7. The computer program product of claim 6, the total quantity value specifying a total quantity of products to be produced.

8. The computer program product of claim 6, wherein the instructions to round comprise instructions to use a previously rounded quantity of a first product type for a desired quantity value of a second product type.

9. The computer program product of claim 6, wherein the plurality of distribution rules are defined by a ratio, a percentage, or a specific value associated with the separate characteristic of the product type.

10. The computer program product of claim 6, wherein the separate characteristic is any one of a time, a color, a model, or a size.

* * * * *

UNITED STATES PATENT AND TRADEMARK OFFICE
CERTIFICATE OF CORRECTION

| | | |
|---|---|---|
| PATENT NO. | : 7,636,670 B2 | Page 1 of 1 |
| APPLICATION NO. | : 10/274414 | |
| DATED | : December 22, 2009 | |
| INVENTOR(S) | : Christian Farhad Woehler | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2193 days.

Signed and Sealed this

Ninth Day of November, 2010

David J. Kappos
*Director of the United States Patent and Trademark Office*